United States Patent
Yoshitake et al.

(10) Patent No.: US 12,176,574 B2
(45) Date of Patent: Dec. 24, 2024

(54) POROUS CARRIER AND ELECTROCHEMICAL DEVICE SEPARATOR

(71) Applicant: Taiwan Hopax Chemicals Mfg. Co., Ltd., Kaohsiung (TW)

(72) Inventors: Hideya Yoshitake, Kaohsiung (TW); Wei-Min Chang, Kaohsiung (TW); Li-Jane Her, Kaohsiung (TW); Tsung-Tien Kuo, Kaohsiung (TW); Kai-Chi Chang, Kaohsiung (TW)

(73) Assignee: Taiwan Hopax Chemicals Mfg. Co., Ltd., Kaohsiung (TW)

( * ) Notice: Subject to any disclaimer, the term of this patent is extended or adjusted under 35 U.S.C. 154(b) by 0 days.

(21) Appl. No.: 16/879,782

(22) Filed: May 21, 2020

(65) Prior Publication Data
US 2020/0373539 A1 Nov. 26, 2020

(30) Foreign Application Priority Data
May 22, 2019 (TW) ................................ 108117623
Mar. 13, 2020 (TW) ................................ 109108363

(51) Int. Cl.
*H01M 50/44* (2021.01)
*H01M 50/42* (2021.01)
*H01M 50/429* (2021.01)
*H01M 50/449* (2021.01)
*H01M 50/457* (2021.01)
*H01M 50/489* (2021.01)

(52) U.S. Cl.
CPC ........... *H01M 50/44* (2021.01); *H01M 50/42* (2021.01); *H01M 50/429* (2021.01); *H01M 50/4295* (2021.01); *H01M 50/449* (2021.01); *H01M 50/457* (2021.01); *H01M 50/489* (2021.01)

(58) Field of Classification Search
CPC ........................ H01M 50/4295; H01M 50/449
See application file for complete search history.

(56) References Cited

U.S. PATENT DOCUMENTS

| | | | |
|---|---|---|---|
| 5,486,941 A | 1/1996 | Saiuchi et al. | |
| 9,944,063 B1 | 4/2018 | Lakrout et al. | |
| 2007/0264577 A1 | 11/2007 | Katayama et al. | |
| 2009/0067119 A1* | 3/2009 | Katayama | H01M 50/449 361/523 |
| 2014/0113176 A1 | 4/2014 | Muramatsu et al. | |

(Continued)

FOREIGN PATENT DOCUMENTS

| | | |
|---|---|---|
| CN | 101218695 | 7/2008 |
| CN | 102244220 | 11/2011 |

(Continued)

OTHER PUBLICATIONS

"Office Action of Taiwan Counterpart Application", issued on Jul. 6, 2021, p. 1-p. 6.

(Continued)

*Primary Examiner* — Stephan J Essex
(74) *Attorney, Agent, or Firm* — JCIPRNET (57) ABSTRACT

A porous carrier including a cellulose substrate and a functional layer is provided. The functional layer is located on at least one surface of the cellulose substrate, wherein the functional layer includes an organic polymer elastic filler and a polymer binder. An electrochemical device separator including the porous carrier is also provided.

12 Claims, 6 Drawing Sheets

(56) References Cited

U.S. PATENT DOCUMENTS

| | | | |
|---|---|---|---|
| 2014/0272532 A1 | 9/2014 | Park et al. | |
| 2014/0308565 A1 | 10/2014 | Lee et al. | |
| 2015/0056490 A1* | 2/2015 | Shimizu | H01M 50/449 429/144 |
| 2018/0205118 A1* | 7/2018 | Chu | H01M 50/434 |
| 2018/0311931 A1 | 11/2018 | Wodzinski et al. | |
| 2019/0237731 A1* | 8/2019 | Park | H01M 50/449 |

FOREIGN PATENT DOCUMENTS

| | | | | |
|---|---|---|---|---|
| CN | 104163943 | | 11/2014 | |
| CN | 104981921 | | 10/2015 | |
| CN | 105140451 | | 12/2015 | |
| CN | 105470435 | | 4/2016 | |
| CN | 105470435 A | * | 4/2016 | H01M 50/403 |
| CN | 107230766 | | 10/2017 | |
| JP | 2005302341 | | 10/2005 | |
| JP | 2006164761 | | 6/2006 | |
| JP | 2015185515 | | 10/2015 | |
| JP | 2016024866 | | 2/2016 | |
| TW | 201737531 | | 10/2017 | |
| WO | 2007066768 | | 6/2007 | |

OTHER PUBLICATIONS

"Office Action of Japan Counterpart Application", issued on Jun. 10, 2021, p. 1-p. 3.

"Office Action of China Counterpart Application", issued on May 5, 2022, p. 1-p. 8.

"Office Action of Taiwan Counterpart Application", issued on Oct. 6, 2021, p. 1-p. 6.

"Notice of allowance of China Counterpart Application", issued on Sep. 19, 2022, p. 1-p. 5.

Jianjun Zhang et al., "Supporting Information: A Renewable and Superior Thermal-Resistant Cellulose-Based Composite Nonwoven as Lithium-Ion Battery Separator", Applied Materials & Interfaces, Jan. 2013, pp. 1-3.

"Office Action of Europe Counterpart Application", issued on Jun. 19, 2024, pp. 1-7.

* cited by examiner

POROUS CARRIER AND ELECTROCHEMICAL DEVICE SEPARATOR

CROSS-REFERENCE TO RELATED APPLICATION

This application claims the priority benefits of Taiwan application serial no. 108117623, filed on May 22, 2019, and Taiwan application serial no. 109108363, filed on Mar. 13, 2020. The entirety of each of the above-mentioned patent applications is hereby incorporated by reference herein and made a part of this specification.

BACKGROUND OF THE INVENTION

Field of the Invention

The invention relates to a carrier and a separator, and particularly relates to a porous carrier and an electrochemical device separator.

Description of Related Art

At present, lithium ion batteries can be used as storage batteries for portable devices, such as personal computers or mobile phones, hybrid electric vehicles, or electric vehicles. Since the lithium ion batteries have characteristics of repeated charge and discharge, light weight, high voltage value, and high energy density, their market demand is increasing day by day, and the requirements of the user for the service life of the lithium ion batteries are also increasing.

A separator in the lithium ion batteries must have good stability for electrolytes and electrodes, wherein non-woven fabrics have better ionic conductivity, wettability, and high temperature resistance than other materials. However, cellulose itself is not elastic. Thus, if the cellulose is used as the material of the non-woven fabric separator, the separator of the lithium ion batteries will be compressed after long-term charging and discharging cycles, resulting in a gap between the electrodes and the separator. Therefore, the impedance of the lithium ion batteries is increased, thereby shortening the life of the lithium ion batteries. Thus, how to improve the problem of the increase of the impedance after the separator is compressed, so that the lithium ion batteries can meet the requirements of the current industry, is a problem that technicians in this field need to solve urgently.

SUMMARY OF THE INVENTION

The invention provides a porous carrier, which has better compression resistance and recovery.

The invention further provides an electrochemical device separator including the porous carrier of the invention, and thus has better compression resistance and recovery. When the electrochemical device separator of the invention is used as the separator of the lithium ion battery, the lithium ion battery may have a longer life.

The invention provides a porous carrier including a cellulose substrate and a functional layer. The functional layer is located on at least one surface of the cellulose substrate, wherein the functional layer includes an organic polymer elastic filler and a polymer binder.

According to an embodiment of the invention, an elastic coefficient of the organic polymer elastic filler is between 200 kgf/mm$^2$ and 500 kgf/mm$^2$.

According to an embodiment of the invention, a recovery ratio of the porous carrier is at least 60% or more.

According to an embodiment of the invention, a compression ratio of the porous carrier is 12% or less.

According to an embodiment of the invention, a material of the cellulose substrate includes a natural fiber, a modified natural fiber, or a combination thereof.

According to an embodiment of the invention, the natural fiber includes cotton, hemp, coconut, or a combination thereof.

According to an embodiment of the invention, a material of the organic polymer elastic filler includes an ethylenically unsaturated monomer.

According to an embodiment of the invention, the ethylenically unsaturated monomer is selected at least one of the group consisting of ethylenically unsaturated carboxylic acid alkyl ester or derivatives thereof, conjugated dienes-based compounds or derivatives thereof, ethylenically unsaturated carboxylic acid or derivatives thereof, and aromatic vinyl compounds or derivatives thereof.

According to an embodiment of the invention, a thickness of the porous carrier is between 13 μm and 50 μm.

According to an embodiment of the invention, a thickness of the cellulose substrate is between 12 μm and 50 μm.

According to an embodiment of the invention, a thickness of the functional layer is between 0.5 μm and 20 μm.

According to an embodiment of the invention, a fiber diameter of the cellulose substrate is between 0.01 μm and 50 μm.

According to an embodiment of the invention, a weight percentage of the organic polymer elastic filler in the functional layer is between 50% and 99.9%.

According to an embodiment of the invention, the functional layer is continuously or discontinuously located on at least one surface of the cellulose substrate.

According to an embodiment of the invention, the functional layer is located on two opposite surfaces of the cellulose substrate.

The invention provides an electrochemical device separator including the porous carrier.

Based on the above, the porous carrier of the invention has better compression resistance and elastic recovery by coating the organic polymer elastic filler on at least one surface thereof. Thus, when the porous carrier is applied to the separator of the lithium ion battery, since the porous carrier of the invention is not easy to be compressed and has better recovery, the gap between the separator and the electrode is less likely to be generated after the lithium ion battery is charged and discharged several times. Therefore, the impedance is not easy to be increased, and thus the lithium ion battery may have a longer life.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with the any numerical value and the smaller numerical range stated explicitly in the specification.

In the following, embodiments are provided to further describe the invention, but the embodiments are only exemplary and are not intended to limit the scope of the invention.

Figure 1:
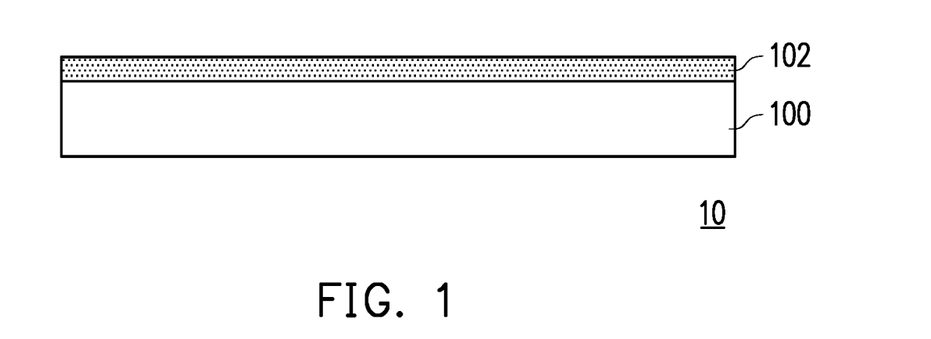
FIG. 1 is a schematic view illustrating a porous carrier according to some embodiments of the invention.
Figure 2:
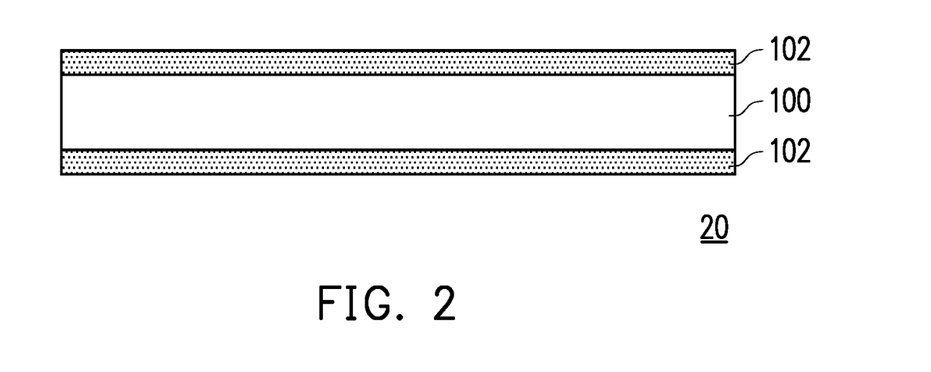
FIG. 2 is a schematic view illustrating a porous carrier according to other embodiments of the invention.

FIG. 1 is a schematic view illustrating a porous carrier according to some embodiments of the invention. FIG. 2 is a schematic view illustrating a porous carrier according to other embodiments of the invention.

Referring to FIG. 1, the invention provides a porous carrier 10 including a cellulose substrate 100 and a functional layer 102. Specifically, the functional layer 102 is located on at least one surface of the cellulose substrate 100, wherein the functional layer 102 includes an organic polymer elastic filler and a polymer binder. In some embodiments, a thickness of the porous carrier 10 is between 13 μm and 50 μm, for example. In other embodiments, the thickness of the porous carrier 10 is between 20 μm and 25 μm, for example, but the invention is not limited thereto. In some embodiments, the functional layer 102 of the porous carrier 10 is located on one surface of the cellulose substrate 100 as shown in FIG. 1, but the invention is not limited thereto. In some embodiments, a functional layer 102 of a porous carrier 20 is located on two opposite surfaces of the cellulose substrate 100 as shown in FIG. 2. That is, the porous carrier of the invention may be provided with the functional layer 102 on one surface or two opposite surfaces of the cellulose substrate 100 according to the requirements of the user.

In some embodiments, a material of the cellulose substrate 100 includes a natural fiber, a modified natural fiber, or a combination thereof, for example. In some embodiments, the natural fiber includes cotton, hemp, coconut, or a combination thereof, for example, but the invention is not limited thereto. In the present embodiment, the cellulose substrate 100 is a nanocellulose non-woven fabric, for example, but the invention is not limited thereto. In some embodiments, a thickness of the cellulose substrate 100 is between 12 μm and 50 μm, for example. In other embodiments, the thickness of the cellulose substrate 100 is between 20 μm and 25 μm, for example, but the invention is not limited thereto. In some embodiments, a fiber diameter of the cellulose substrate 100 is between 0.01 μm and 50 μm, for example, but the invention is not limited thereto.

In some embodiments, a material of the organic polymer elastic filler in the functional layer 102 includes an ethylenically unsaturated monomer. In some embodiments, the ethylenically unsaturated monomer is selected at least one of the group consisting of ethylenically unsaturated carboxylic acid alkyl ester or derivatives thereof, conjugated dienes-based compounds or derivatives thereof, ethylenically unsaturated carboxylic acid or derivatives thereof, and aromatic vinyl compounds or derivatives thereof, for example. For instance, the organic polymer elastic filler is poly methyl methacrylate (PMMA), styrene-co-methyl methacrylate (PMMA-PS), poly styrene, for example, but the invention is not limited thereto. In some embodiments, an elastic coefficient of a polymer particle of the organic polymer elastic filler is between 200 kgf/mm$^2$ and 500 kgf/mm$^2$, for example. In other embodiments, the elastic coefficient of the polymer particle of the organic polymer elastic filler is between 200 kgf/mm$^2$ and 400 kgf/mm$^2$, for example. In some embodiments, a particle size of the polymer particle of the organic polymer elastic filler is between 0.8 μm and 5 μm, for example. In the present embodiment, the particle size distribution of the polymer particle of the organic polymer elastic filler is monodisperse. That is, a coefficient of variation of the particle size distribution of the polymer particle is less than 5%, for example, but the invention is not limited thereto. In some embodiments, a heat-resistant temperature of the polymer particle of the organic polymer elastic filler is at least higher than 250° C. For instance, the heat-resistant temperature of the polymer particle of the organic polymer elastic filler is between 280° C. and 340° C., but the invention is not limited thereto. In some embodiments, a weight percentage of the organic polymer elastic filler in the functional layer 102 is between 50% and 99.9%, for example, but the invention is not limited thereto.

In some embodiments, the polymer binder in the functional layer 102 is selected at least one of the group consisting of polyvinylidene difluoride (PVDF), styrene-butadiene rubber (SBR), polyacrylic acid (PAA), and carboxymethyl cellulose (CMC), for example, but the invention is not limited thereto. In some embodiments, a weight percentage of the polymer binder in the functional layer 102 is between 2.5% and 10%, for example, but the invention is not limited thereto.

In some embodiments, the functional layer 102 is continuously or discontinuously located on at least one surface of the cellulose substrate 100. Particularly, in some embodiments, the functional layer 102 is continuously located on the surface of the cellulose substrate 100, for example. That is, the functional layer 102 on one surface or two opposite surfaces of the cellulose substrate 100 is a thin layer having a uniform thickness, for example. In other embodiments, the functional layer 102 is discontinuously located on the surface of the cellulose substrate 100, for example. That is, the functional layer 102 on one surface or two opposite surfaces of the cellulose substrate 100 is not a complete layer structure, but is distributed on the surface of the cellulose substrate 100 in a dot shape, a block shape, a strip shape, or an irregular shape, for example. In some embodiments, under the condition that the functional layer 102 is located on two opposite surfaces of the cellulose substrate 100 as shown in FIG. 2, the functional layer 102 may be continuously located on the two opposite surfaces of the cellulose substrate 100, for example. In other embodiments, the functional layer 102 may also be discontinuously located on the two opposite surfaces of the cellulose substrate 100, for example, but the invention is not limited thereto. In other embodiments, the functional layer 102 may be continuously located on one surface of the cellulose substrate 100 and discontinuously located on another one surface of the cellulose substrate 100, for example, but the invention is not limited thereto. In some embodiments, a thickness of the functional layer 102 is between 0.5 μm and 20 μm, for example, but the invention is not limited thereto. In other embodiments, the thickness of the functional layer 102 may also be between 0.5 μm and 8 μm, for example.

It should be noted that, in some embodiments, a recovery ratio of the porous carrier of the invention is at least 60% or more, for example. For instance, the recovery ratio of the porous carrier is between 60% and 99%, for example, preferably, between 60% and 70%, for example, but the invention is not limited thereto. In some embodiments, a compression ratio of the porous carrier of the invention is 12% or less, for example. For instance, the compression ratio of the porous carrier is between 1% and 12%, for example, preferably, between 5% and 12%, for example, but the invention is not limited thereto.

The invention further provides a manufacturing method of the porous carrier 10 including the following steps. The cellulose substrate 100 is provided. The functional layer 102 is coated on at least one surface of the cellulose substrate 100, wherein the functional layer 102 includes the organic polymer elastic filler and the polymer binder. In some embodiments, a method of coating the functional layer 102 includes a spin coating method, a spray method, a roller coating method, a flow coating method, a blade coating method, a dipping method, or a combination thereof, for example, but the invention is not limited thereto.

The invention further provides an electrochemical device separator including the porous carrier 10 or the porous carrier 20 in the aforementioned embodiments. It should be noted that, since the cellulose substrate 100 itself is not elastic, by coating the functional layer 102 on at least one surface of the cellulose substrate 100, the porous carrier 10 or the porous carrier 20 having the functional layer 102 may be more elastic. Thus, the porous carrier 10 or the porous carrier 20 may have better recovery after compression. Additionally, the porous carrier 10 or the porous carrier 20 having the functional layer 102 may also have better compression resistance. In the application of electrochemical devices, the porous carrier 10 or the porous carrier 20 may be used as an electrochemical device separator, for example. Since the porous carrier 10 or the porous carrier 20 have better compression resistance, and have better recovery after compression, the gap between the electrode and the electrochemical device separator is less likely to be generated in the electrochemical device after long-term charging and discharging cycles. Therefore, the impedance is not easy to be increased, and thus the electrochemical device may have a longer life.

It should be noted that, the electrochemical device of the present invention is not particularly limited. In some embodiments, the electrochemical device is a lithium ion battery, but the invention is not limited thereto. In the present embodiment, the electrochemical device is composed of a positive electrode, a negative electrode, an electrolyte, and the electrochemical device separator, for example, but the invention is not limited thereto.

In some embodiments, the positive electrode of the electrochemical device is composed of a positive electrode active material, for example. The positive electrode active material is not particularly limited, as long as it can be used as the positive electrode active material of the positive electrode of the lithium ion battery. For instance, the positive electrode active material comprises lithium metal, lithium-nickel-containing composite compounds, lithium mixed transition metal oxide, lithium mixed transition metal sulfide, or a combination thereof, for example. The lithium-nickel-containing composite compounds comprise Ni—Mn—Co composite compounds, Ni—Mn—Al composite compounds, Ni—Co—Al composite compounds, or combinations thereof, for example. The lithium mixed transition metal sulfide is $LiTiS_2$, for example. The lithium mixed transition metal oxide comprises $LiCoO_2$, $LiMn_2O_4$, $LiFePO_4$, $LiMnO_2$, $LiMoO_3$, $LiV_2O_5$, or a combination thereof, for example. However, the invention is not limited thereto. The positive electrode active material may be selected from one of the above materials or combinations thereof, for example, but the invention is not limited thereto. In the present embodiment, the positive electrode active material is $Li(Ni_{0.5}Mn_{0.3}Co_{0.2})O_2$, for example, but the invention is not limited thereto.

In some embodiments, the negative electrode of the electrochemical device is composed of a negative electrode active material, for example. The negative electrode active material is not particularly limited, as long as it can be used as the negative electrode active material of the negative electrode of the lithium ion battery. In other words, the negative electrode active material comprises elements capable of absorbing and releasing lithium ions, for example. That is, the elements can be alloyed with lithium to achieve high capacity of the lithium ion battery. For instance, the negative electrode active material comprises carbon, silicon, germanium, tin, lead, aluminum, indium, or zinc, for example. In some embodiments, carbon comprises graphite, amorphous carbon, carbon fibers, coke, activated carbon, carbon nanotubes, carbon nanofibers, or fullerenes, for example, but the invention is not limited thereto. In some embodiments, the negative electrode active material comprises metal compounds, for example. The metal compounds comprise lithium metal compounds (e.g., LiAl, $Li_4Si$, $Li_{4.4}Pb$, $Li_{4.4}Sn$), metal oxide (e.g., SnO, $SnO_2$, GeO, $GeO_2$, $In_2O$, $In_2O_3$, PbO, $PbO_2$, $Pb_2O_3$, $Pb_3O_4$, SiO, ZnO), lithium metal oxide (e.g., lithium-transition metal composite oxide), or a combination thereof, for example, but the invention is not limited thereto. The negative electrode active material may be selected from one of the above materials or combinations thereof, for example, but the invention is not limited thereto. In the present embodiment, the negative electrode active material is natural graphite, for example, but the invention is not limited thereto.

In some embodiments, the electrolyte of the electrochemical device is not particularly limited. For instance, the electrolyte of the electrochemical device is, for example, the electrolyte that a lithium salt as an electrolyte is dissolved in a non-aqueous organic solvent at a concentration of about 1 mol/L, but the invention is not limited thereto. In some embodiments, the lithium salt comprises $LiClO_4$, $LiBF_4$, LiI, $LiPF_6$, $LiCF_3SO_3$, $LiCF_3CO_2$, $LiAsF_6$, $LiSbF_6$, $LiAlCl_4$, LiCl, LiBr, $LiB(C_2H_5)_4$, $LiCH_3SO_3$, $LiC_4F_9SO_3$, $Li(CF_3SO_2)_2N$, $Li[(CO_2)_2]_2B$, or a combination thereof, for example. The non-aqueous organic solvent comprises carbonates (e.g., propylene carbonate, ethylene carbonate (EC), butylene carbonate, dimethyl carbonate (DMC), diethyl carbonate, or methyl ethyl carbonate), lactones (e.g., γ-butyrolactone), ethers (e.g., trimethoxymethane, 1,2-dimethoxyethane, diethylether, 2-ethoxyethane, tetrahydrofuran, or 2-methyltetrahydrofuran), sulfoxides (e.g., dimethyl sulfoxide), oxolanes (e.g., 1,3-dioxolane or 4-methyl-1,3-dioxolane), nitrogen-containing ones (e.g., acetonitrile, nitromethane, or NMP), esters (e.g., methyl formate, methyl acetate, butyl acetate, methyl propionate, ethyl propionate, or phosphate trimester), glymes (e.g., diglyme, triglyme, or tetraglyme), ketones (e.g., acetone, diethyl ketone, methyl ethyl ketone, or methyl isobutyl ketone), sulfones (e.g., sulfolane), oxazolidinones (e.g., 3-methyl-2-oxazolidinone), or sultones (e.g., 1,3-propane sultone, 4-butane sultone, or naphtha sultone), for example, but the invention is not limited thereto. The electrolyte may be selected from one of the above materials or combinations thereof, for example, but the invention is not limited thereto. In the present embodiment, the electrolyte is lithium hexafluorophosphate ($LiPF_6$) dissolved in ethylene carbonate and dimethyl carbonate for example, but the invention is not limited thereto.

Experiment

The invention is more specifically described in the following with reference to experimental examples. Although the following experiments are described, the materials used and the amount and ratio thereof, as well as handling details and handling process . . . etc., may be suitably modified without exceeding the scope of the invention. Accordingly, restrictive interpretation should not be made to the invention based on the experiments described below.

In the embodiment, the definition of "compression" is that the deformation amount of the porous carrier in the thickness direction (or the length deformation amount of the particles) reaches less than 20% of the original thickness of the porous carrier (or the original diameter of the particles) when a specific pressure is applied to the porous carrier (the particles).

Experiment 1

Figure 3:
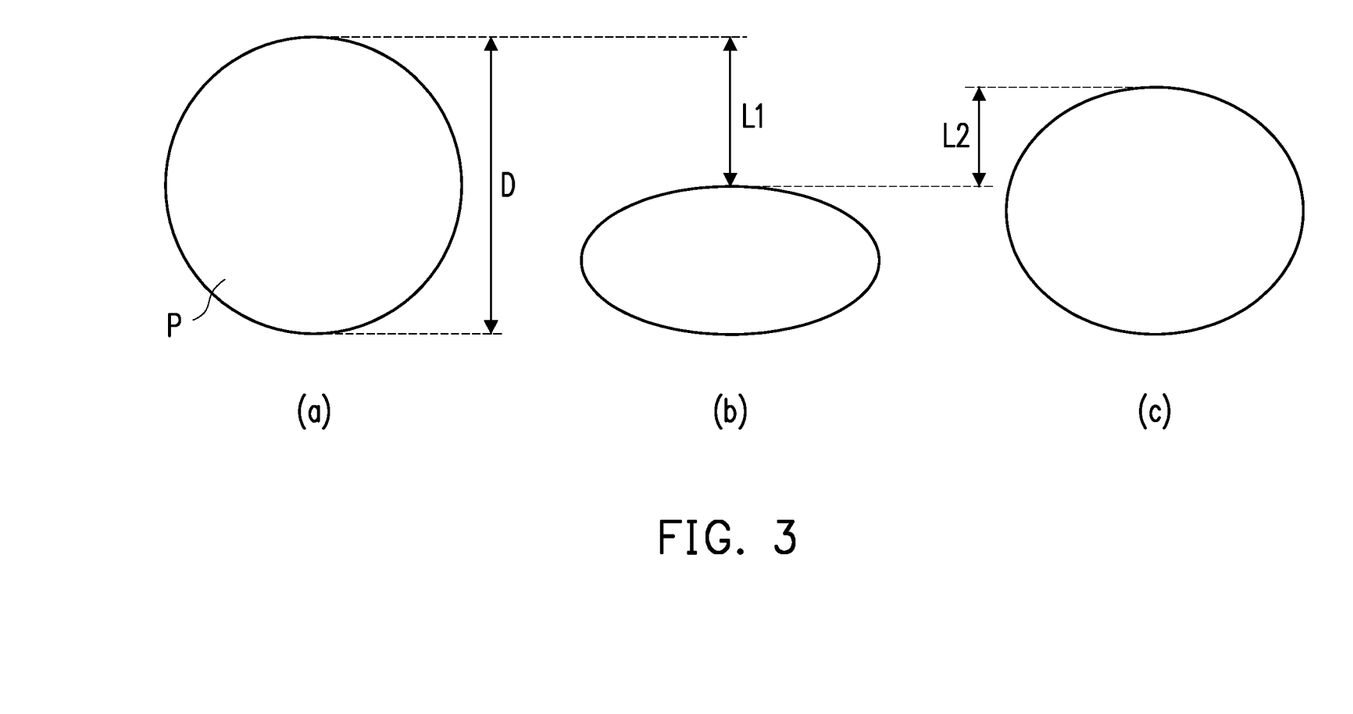
FIG. 3 is schematic views illustrating a test method for compressibility and recovery of a single particle according to the invention.

FIG. 3 is schematic views illustrating a test method for compressibility and recovery of a single particle according to the invention.

Hereinafter, the properties of the organic polymer elastic filler were tested. In the present experiment, poly methyl methacrylate (PMMA, provided by Taiwan Industrial Technology Research Institute) and styrene-co-methyl methacrylate (PMMA-PS, provided by Taiwan Industrial Technology Research Institute) were selected as the material of the organic polymer elastic filler of the present experiment, wherein the PMMA particles are highly crosslinked, and the PMMA-PS particles are moderately crosslinked. In the present experiment, the particle size, heat resistance, and mechanical properties of the PMMA particles and the PMMA-PS particles were analyzed respectively. The test methods are described below, and the test results are shown in Table 1.

<Analysis Methods of Particle Properties>

Particle size analysis: The particle diameters in different regions were observed using an electron microscope, and a coefficient of variation (Cv) of the particle size distribution was calculated.

Thermogravimetric loss analysis: The analysis was performed using a thermogravimetric analyzer (model TGA Q50). 10 mg of sample of the particles was taken, heated 10° C. per minute, and heated from room temperature to 800° C. The 5% sample weight loss temperature was defined as TGA 5% weight loss.

Mechanical properties analysis: Referring to U.S. Pat. No. 5,486,941, a single particle was taken for micro compression testing. A micro compression tester model is MCT-511 (SHIMADZU), and a diameter of the pressor is 50 μm.

Compression ratio of the particle: Referring to (a) and (b) of FIG. 3, a specific pressure was applied to a single particle P until the force value reached 1 mN, a displacement length was recorded as L1, and an original diameter of the single particle was D. The compression ratio (%) of the particle P is defined as the percentage of the displacement length L1 to the original diameter D of the single particle P.

Compression ratio of the particle (%)=$L1/D$×100%

Recovery ratio of the particle: Referring to (a), (b) and (c) of FIG. 3, a specific pressure was applied to a single particle until the force value reached 1 mN, and a displacement length was recorded as L1. The pressure was released after maintaining the pressure value for 10 seconds. Until the minimum stress value that the instrument can detect (i.e., 0.01 mN), a displacement length was recorded as L2. The recovery ratio (%) of the particle P is defined as the percentage of the displacement length L2 to the displacement length L1.

Recovery ratio of the particle (%)=$L2/L1$×100%

K value: The calculation formula is as shown in Formula 1 below.

$$k=(3/\sqrt{2})\cdot F\cdot S^{-3/2}\cdot R^{-1/2} \qquad \text{Formula 1}$$

wherein,
F: the pressure applied to the single particle (kgf);
S: the displacement length of the single particle after 10% compression (μm);
R: the diameter of the single particle (μm).

TABLE 1

| Organic polymer elastic filler | | PMMA | PMMA-PS |
|---|---|---|---|
| Particle size analysis | Particle size (μm) | 2.3 | 2.3 |
| | Particle size distribution (%) | Cv < 5% | Cv < 5% |
| | Heat-resistant temperature (° C.) (TGA 5% weight loss) | >300 | >300 |
| Mechanical properties analysis | Recovery ratio (%) | 57.12 | 42.99 |
| | Compression ratio (%) | 26.47 | 30.82 |
| | K10% | 332 | 258 |
| | K20% | 259 | 203 |

From the analysis results in Table 1 above, it can be known that, the particle size distribution of the organic polymer elastic filler of the invention is monodisperse (Cv<5%), and the organic polymer elastic filler has good heat resistance. Further, according to the results of the recovery ratio, the compression ratio, and the k value, the PMMA particles have stronger rigidity and better elastic recovery than the PMMA-PS particles.

Experiment 2

Hereinafter, the properties of the porous carrier of the invention were tested. In the present experiment, poly methyl methacrylate (PMMA) and styrene-co-methyl methacrylate (PMMA-PS) were selected as the material of the organic polymer elastic filler of the present experiment. In the present experiment, the thickness and the mechanical properties of the porous carrier of examples and comparative examples of the invention were measured and analyzed respectively. The manufacturing method of each example and the test methods of the properties thereof are described below, and the test results are shown in Table 2. The porous carrier in the present experiment is a single layer structure.

Example 1

First, the PMMA particles were mixed in a solvent of N-methyl-2-pyrrolidone (NMP), and a weight ratio of the two is 10:90 sequentially. Next, ultrasonic waves were used for dispersion for 30 minutes to form a mixture solution. Then, polyvinylidene difluoride (PVDF, purchased from KUREHA Corporation, Japan, model W1700) was added into the mixture solution, and a weight ratio of PVDF to the mixture solution is 2:98. A slurry was prepared by thoroughly stirring and dissolving for 24 hours. Then, the slurry was uniformly coated on one surface of a paper separator (purchased from Nippon Kodoshi Corporation) using a No. 10 wire bar, and placed in an oven and dried at 90° C. for 1 hour to obtain the porous carrier of Example 1.

Example 2

The porous carrier of Example 2 was prepared according to the preparation procedure similar to that of Example 1, and the difference is that, in Example 2, the PMMA particles were replaced with the PMMA-PS particles. Thus, the porous carrier of Example 2 was obtained.

Comparative Example

The porous carrier of Comparative example was prepared according to the preparation procedure similar to that of Example 1, and the difference is that, in Comparative example, instead of adding the PMMA particles, PVDF was directly dissolved in the NMP solvent, wherein the weight ratio of PVDF to the NMP solvent is 2:98. Thus, the porous carrier of Comparative example was obtained.

<Analysis Methods of Single Layer Porous Carrier Properties>

The thickness and the mechanical properties of the single layer porous carrier of Example 1, Example 2, and Comparative example were measured and analyzed respectively. The methods of recovery ratio and compression ratio tests were similar to those described in Experiment 1 above, except that the test subject was replaced from a single particle to a single layer porous carrier, and the force value reached 2.5 mN.

Compression ratio of the single layer porous carrier: A specific pressure was applied to a single particle P until the force value reached 2.5 mN, a displacement thickness was recorded as $t_1$, and an original thickness of the single layer porous carrier was $t_0$. The compression ratio (%) of the single layer porous carrier is defined as the percentage of the displacement thickness $t_1$ to original thickness $t_0$ of the single layer porous carrier.

Compression ratio of the single layer porous carrier (%)=$t_1/t_0 \times 100\%$

Recovery ratio of the single layer porous carrier: A specific pressure was applied to a single particle until the force value reached 2.5 mN, and a displacement thickness was recorded as $t_1$. The pressure was released after maintaining the pressure value for 10 seconds. Until the minimum stress value that the instrument can detect (i.e., 0.01 mN), a displacement thickness was recorded as $t_2$. The recovery ratio (%) of the single layer porous carrier is defined as the percentage of the displacement thickness $t_2$ to the displacement thickness $t_1$.

Recovery ratio of the single layer porous carrier (%)=$t_2/t_1 \times 100\%$

TABLE 2

|  | Thickness (μm) | Force (mN) | displacement thickness $t_1$(μm) | displacement thickness $t_2$(μm) | Compression ratio (%) | Recovery ratio (%) |
|---|---|---|---|---|---|---|
| Example 1 | 28 | 2.5 | 1.46 | 1.00 | 5.2 | 68.7 |
| Example 2 | 28 | 2.5 | 2.25 | 1.14 | 8.0 | 62.8 |
| Comparative Example | 24 | 2.5 | 2.91 | 1.66 | 12.1 | 57.1 |

From the analysis results in Table 2 above, it can be known that, the porous carriers of Example 1 and Example 2 have a lower compression ratio than the porous carrier of Comparative example, which means that the porous carrier coated with the organic polymer elastic filler is not easy to be compressed. At the same time, the porous carriers of Example 1 and Example 2 also have a higher recovery ratio than the porous carrier of Comparative example, which means that the porous carrier coated with the organic polymer elastic filler has better elastic recovery. Additionally, the porous carrier of Example 1 has a lower compression ratio than the porous carrier of Example 2, which means that the porous carrier coated with the organic polymer elastic filler (PMMA) of Example 1 has stronger rigidity, and the porous carrier coated with the organic polymer elastic filler (PMMA-PS) of Example 2 is relatively soft.

Experiment 3

Figure 4A:
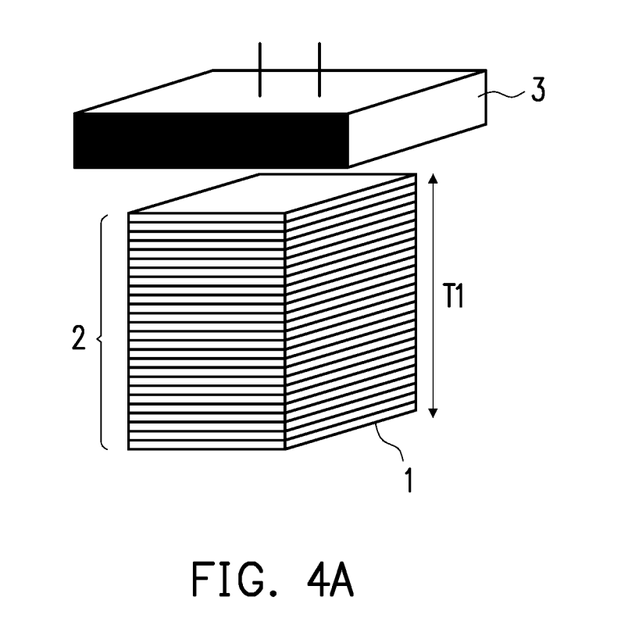
FIG. 4A and FIG. 4B are schematic views illustrating a test method for compressibility and recovery of a multilayer porous carrier according to the invention.
Figure 4B:
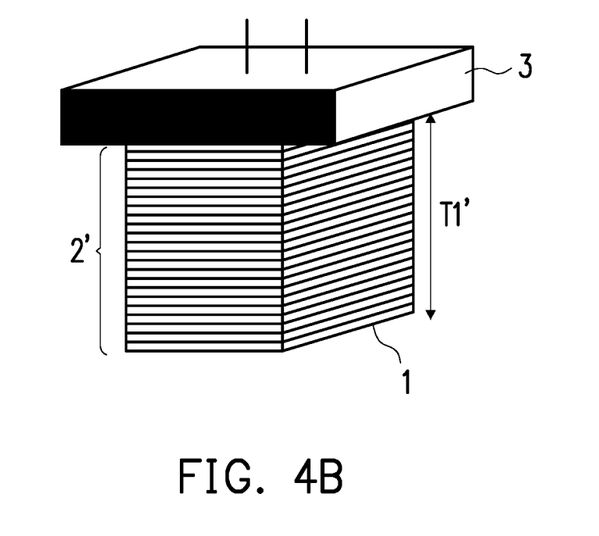
Figure 5:
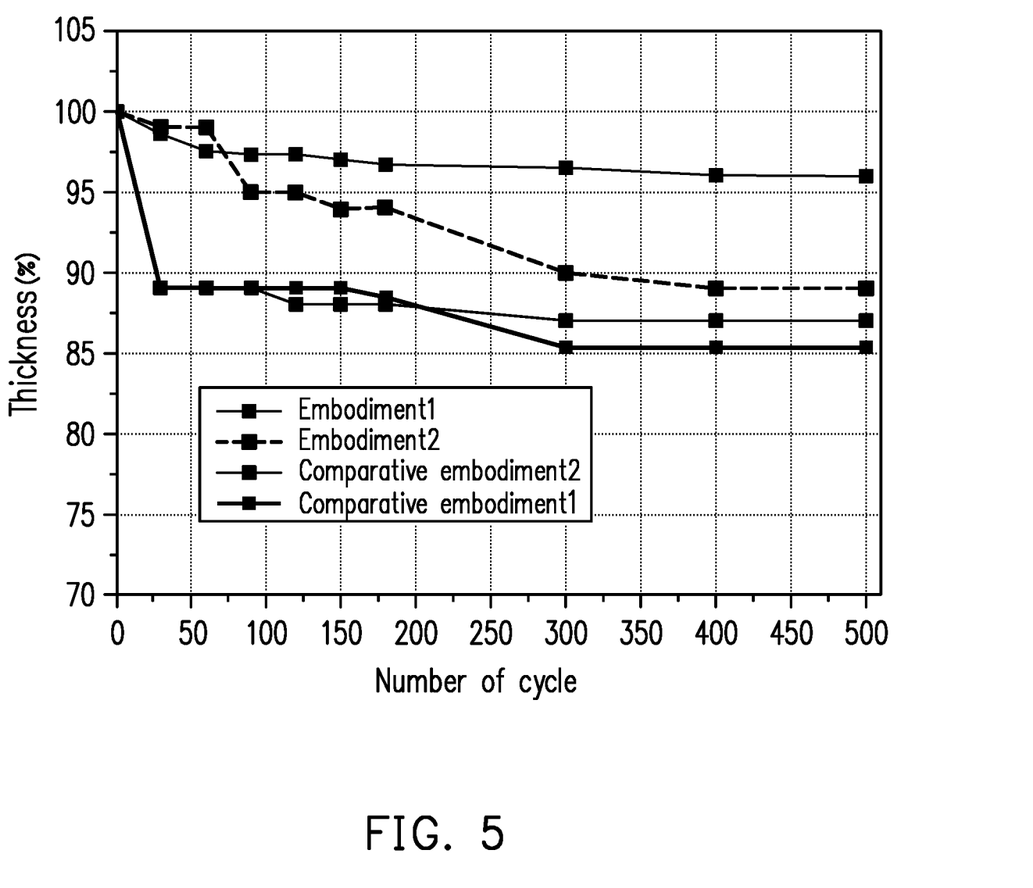
FIG. 5 is a result of the compressibility test of the multilayer porous carrier of some experimental examples of the invention.
Figure 6:
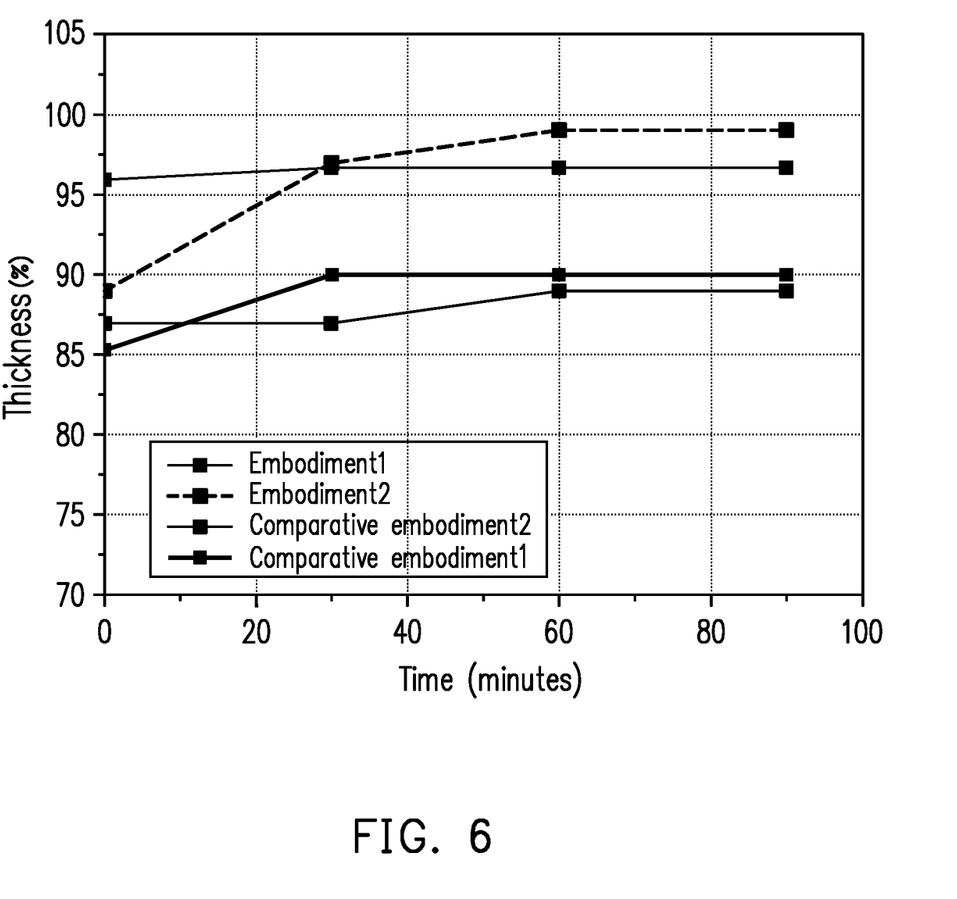
FIG. 6 is a result of the recovery test of the multilayer porous carrier of some experimental examples of the invention.

FIG. 4A and FIG. 4B are schematic views illustrating a test method for compressibility and recovery of a multilayer porous carrier according to the invention. FIG. 5 is a result of the compressibility test of the multilayer porous carrier of some experimental examples of the invention. FIG. 6 is a result of the recovery test of the multilayer porous carrier of some experimental examples of the invention.

Hereinafter, the single layer porous carriers of each example were stacked respectively to form multilayer porous carriers. In the present experiment, the mechanical properties of the multilayer porous carriers of embodiments and comparative embodiments of the invention were analyzed respectively. The manufacturing method of each embodiment and each comparative embodiment and the test methods of the properties thereof are described below (referring to FIG. 4A and FIG. 4B), and the test results are shown in FIG. 5 and FIG. 6. The porous carrier in the present experiment is a multilayer stacked structure.

Embodiment 1

The single layer porous carrier of Example 1 was cut to a size of 5 cm×5 cm, and then stacked to a thickness of about 2 mm (i.e., 100 layers of multilayer porous carrier was stacked). Then, the multilayer porous carrier of Embodiment 1 was obtained.

Embodiment 2

The multilayer porous carrier of Embodiment 2 was prepared according to the preparation procedure similar to that of Embodiment 1, and the difference is that, in Embodiment 2, the single layer porous carrier of Example 1 was replaced with the single layer porous carrier of Example 2. Thus, the multilayer porous carrier of Embodiment 2 was obtained.

Comparative Embodiment 1

In Comparative embodiment 1, the paper separator was not coated other materials. Instead, the paper separator was directly cut to a size of 5 cm×5 cm, and then stacked to a thickness of about 2 mm. Then, the multilayer porous carrier of Comparative embodiment 1 was obtained.

Comparative Embodiment 2

The multilayer porous carrier of Comparative embodiment 2 was prepared according to the preparation procedure similar to that of Embodiment 1, and the difference is that, in Comparative embodiment 2, the single layer porous carrier of Example 1 was replaced with the single layer porous carrier of Comparative example. Thus, the multilayer porous carrier of Comparative embodiment 2 was obtained.
<Analysis Methods of Multilayer Porous Carrier Properties>

Compression ratio of the multilayer porous carrier (thickness maintenance ratio, %): Referring to FIG. 4A and FIG. 4B, first, single layer porous carriers 1 were stacked to form a multilayer porous carrier 2. Then, a rectangular pressor 3 (15 cm×10 cm) was used to apply pressure on the multilayer porous carrier 2 of each embodiment and each comparative embodiment. A thickness T1' (about 1.7 mm) of the multilayer porous carrier 2' after compression was 85% of an original thickness T1. The pressure was released after 2 seconds, and the pressure was repeatedly applied 500 times. A thickness T2 of the multilayer porous carrier 2' after releasing the pressure was recorded with the compression times. The compression ratio of the multilayer porous carrier is defined as the percentage of the difference between the compressed thickness and the original thickness to the original thickness.

Compression ratio of the multilayer porous carrier (%)=$(T1-T2)/T1\times100\%$

Recovery ratio of the multilayer porous carrier (thickness recovery ratio, %): Referring to FIG. 4A and FIG. 4B, first, the single layer porous carriers 1 were stacked to form the multilayer porous carrier 2. Then, the rectangular pressor 3 (15 cm×10 cm) was used to apply pressure on the multilayer porous carrier 2 of each embodiment and each comparative embodiment. The thickness T1' (about 1.7 mm) of the multilayer porous carrier 2' after compression is 85% of an original thickness T1. The pressure was released after 2 seconds. After the pressure was repeatedly applied 500 times, a thickness T3 was measured with time without any pressure applied. The recovery ratio of the multilayer porous carrier is defined as the percentage of compressed thickness of the multilayer porous carrier to the original thickness of the multilayer porous carrier.

Recovery ratio of the multilayer porous carrier (%)=$T3/T1\times100\%$

From the analysis results in FIG. 5, it can be known that, the multilayer porous carriers of Embodiment 1 and Embodiment 2 have a higher thickness maintenance ratio than the multilayer porous carriers of Comparative embodiment 1 and Comparative embodiment 2, which means that the multilayer porous carrier coated with the organic polymer elastic filler is not easy to be compressed, wherein the multilayer porous carrier of Embodiment 1 may still maintain about 96% of the original thickness thereof after 500 compression cycles. By comparison, the multilayer porous carriers of Comparative embodiment 1 and Comparative embodiment 2 may maintain only about 85% to 87% of the original thickness thereof. Additionally, from the analysis results in FIG. 6, it can be known that, the multilayer porous carriers of Embodiment 1 and Embodiment 2 also have a higher recovery ratio than the multilayer porous carriers of Comparative embodiment 1 and Comparative embodiment 2.
Experiment 4

Figure 7:
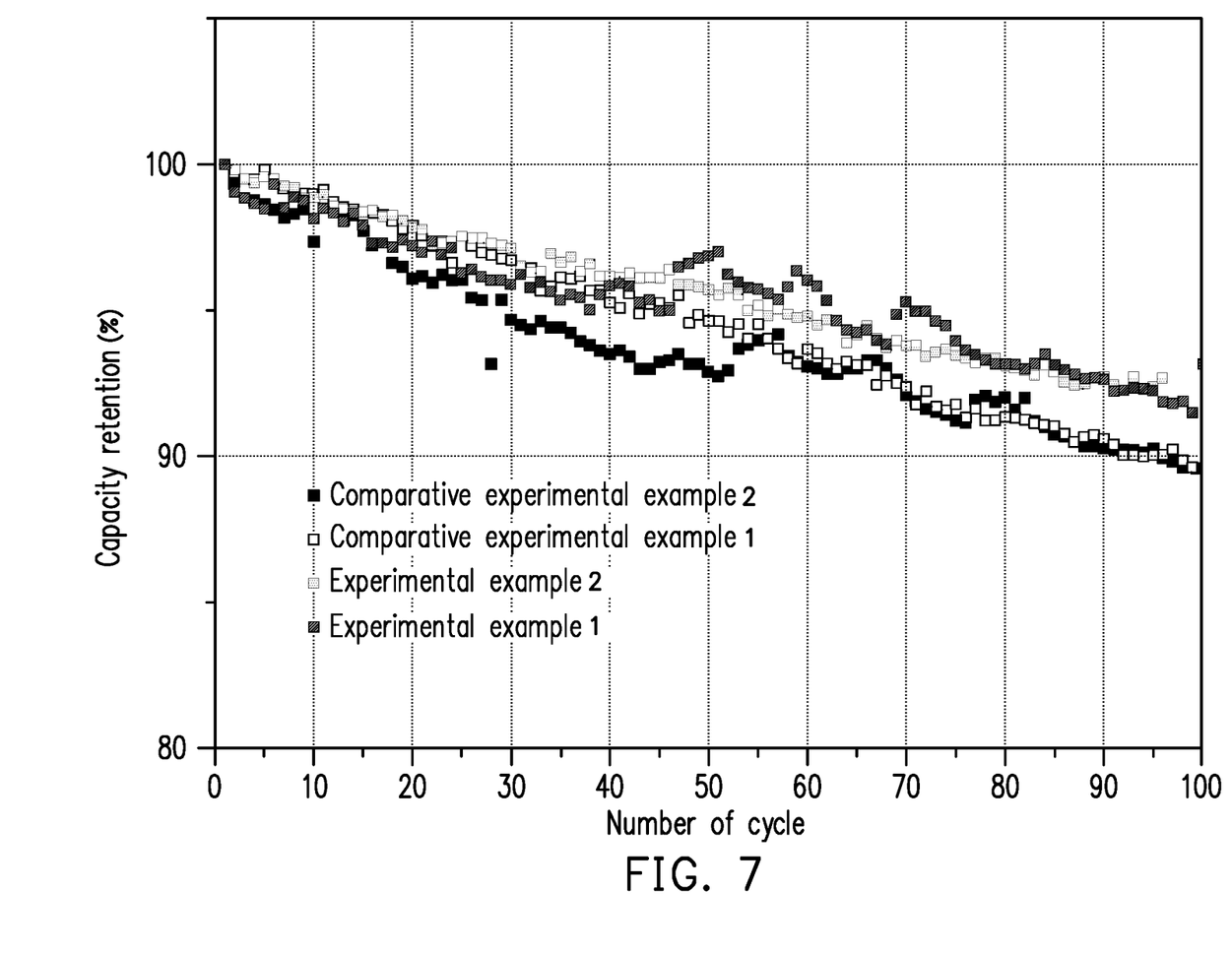
FIG. 7 is a result of cycle performance test of a lithium ion battery of some experimental example of the invention.

FIG. 7 is a result of cycle performance the of a lithium ion battery of some experimental example of the invention.

Hereinafter, the porous carrier of the invention was applied to a lithium ion battery. That is, the porous carrier was used as the separator in the lithium ion battery. The cycle performance of each lithium ion battery was tested. The manufacturing method of each experimental example and each comparative experimental example and the test methods of the cycle performance thereof are described below, and the test results are shown in FIG. 7. The porous carrier in the present experiment is a single layer structure, and the lithium ion battery in the present experiment belongs to a non-aqueous battery.

Experimental Example 1

<Production of Electrode Sheets>

A positive electrode active material was sufficiently mixed with PVDF and conductive carbon at a ratio of 94:3:3, and then dispersed in an NMP solvent to prepare a positive electrode slurry. In the present experiment, the positive electrode active material is $Li(Ni_{0.5}Mn_{0.3}Co_{0.2})O_2$. Then, the positive electrode slurry was coated on an aluminum foil (a thickness of the aluminum foil was 16 μm). After drying and rolling, it was cut into a circular electrode sheet with a diameter of 13 mm to obtain a positive electrode of the present experiment.

A negative electrode active material was sufficiently mixed with PVDF and conductive carbon at a ratio of 95:1:4, and then dispersed in the NMP solvent to prepare a negative electrode slurry. In the present experiment, the negative electrode active material is a natural graphite. Then, the negative electrode slurry was coated on a copper foil (a thickness of the copper foil was 10 μm). After drying and rolling, it was cut into a circular electrode sheet with a diameter of 13 mm to obtain a negative electrode of the present experiment.
<Preparation of Electrolyte>

Ethylene carbonate (EC) was mixed with dimethyl carbonate (DMC) at a weight ratio of 3:7 and dissolved in 1 M lithium hexafluorophosphate ($LiPF_6$) to obtain the electrolyte of the present experiment.
<Assembly of Lithium Ion Battery>

The CR 2032 button battery was used to perform the battery assembly test. The positive electrode, the negative electrode, and the electrolyte of the lithium ion battery of the present experiment were prepared according to the aforementioned methods respectively. In Experimental example 1, the separator of the lithium ion battery was the single layer porous carrier of Example 1 above, and the thickness thereof was 28 μm. Thus, the lithium ion battery of Experimental example 1 was obtained.

Experimental Example 2

The lithium ion battery of Experimental example 2 was prepared according to the preparation procedure similar to that of Experimental example 1, and the difference is that, in Experimental example 2, the separator of the lithium ion battery was replaced with the single layer porous carrier of Example 2, and the thickness thereof is 28 μm. Thus, the lithium ion battery of Experimental example 2 was obtained.

Comparative Experimental Example 1

The lithium ion battery of Comparative experimental example 1 was prepared according to the preparation procedure similar to that of Experimental example 1, and the difference is that, in Comparative experimental example 1, the separator of the lithium ion battery was replaced with the single layer porous carrier of Comparative example, and the thickness thereof is 24 μm. Thus, the lithium ion battery of Comparative experimental example 1 was obtained.

Comparative Experimental Example 2

The lithium ion battery of Comparative experimental example 2 was prepared according to the preparation procedure similar to that of Experimental example 1, and the difference is that, in Comparative experimental example 2, the separator of the lithium ion battery was replaced with a common three-layer structural separator consisting of a three-layer structure of polypropylene/polyethylene/polypropylene (PP/PE/PP, purchased from Celgard, model 2325), and the thickness thereof is 25 μm. Thus, the lithium ion battery of Comparative experimental example 2 was obtained.

<Test Methods of Cycle Performance of Lithium Ion Battery>

In the test, the cycle performance test of the lithium ion battery was performed at room temperature. The charging condition is that, after 1C constant current was charging to 4.2V, the constant voltage 4.2 V was charging to the current being less than 0.1C. The discharging condition is that, 1C constant current was discharging to 3.0V. After repeating 100 times of the charge and discharge cycle, the first discharge capacity was set as $C_0$, and the Nth discharge capacity was set as $C_n$, thereby obtaining the capacity retention of each cycle.

From the analysis results in FIG. 7, it can be known that, After repeating 100 times of the charge and discharge cycle, the lithium ion batteries of Experimental example 1 and Experimental example 2 have higher capacity retention than the lithium ion batteries of Comparative experimental example 1 and Comparative experimental example 2, which means that the porous carrier coated with the organic polymer elastic filler as the separator of the lithium ion battery is not easy to be compressed and has better recovery, so that the battery has a longer life.

In summary, the porous carrier of the invention has better compression resistance and elastic recovery by coating the organic polymer elastic filler on at least one surface thereof.

Thus, when the porous carrier is applied to the separator of the lithium ion battery, since the porous carrier of the invention is not easy to be compressed and has better recovery, the gap between the separator and the electrode is less likely to be generated after the lithium ion battery is charged and discharged several times. Therefore, the impedance is not easy to be increased, and thus the lithium ion battery may have a longer life.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A porous carrier, comprising:
   a cellulose substrate, consisting of a natural fiber, a modified natural fiber, or a combination thereof; and
   a functional layer, directly located on at least one surface of the cellulose substrate, wherein the functional layer comprises an organic polymer elastic filler and a polymer binder,
   wherein the organic polymer elastic filler includes poly methyl methacrylate (PMMA) or styrene-co-methyl methacrylate (PMMA-PS), and a weight percentage of the organic polymer elastic filler in the functional layer is between 50% and 99.9%,
   wherein a coefficient of variation of a particle size distribution of the polymer particle is less than 5%, and
   wherein a particle size of the organic polymer elastic filler is between 2.3 μm and 5 μm.

2. The porous carrier according to claim 1, wherein an elastic coefficient of the organic polymer elastic filler is between 200 kgf/mm$^2$ and 500 kgf/mm$^2$.

3. The porous carrier according to claim 1, wherein a recovery ratio of the porous carrier is at least 60% or more.

4. The porous carrier according to claim 1, wherein a compression ratio of the porous carrier is 12% or less.

5. The porous carrier according to claim 1, wherein the natural fiber comprises cotton, hemp, coconut, or a combination thereof.

6. The porous carrier according to claim 1, wherein a thickness of the porous carrier is between 13 μm and 50 μm.

7. The porous carrier according to claim 1, wherein a thickness of the cellulose substrate is between 12 μm and 50 μm.

8. The porous carrier according to claim 1, wherein a thickness of the functional layer is between 0.5 μm and 20 μm.

9. The porous carrier according to claim 1, wherein a fiber diameter of the cellulose substrate is between 0.01 μm and 50 μm.

10. The porous carrier according to claim 1, wherein the functional layer is continuously or discontinuously located on the at least one surface of the cellulose substrate.

11. The porous carrier according to claim 1, wherein the functional layer is located on two opposite surfaces of the cellulose substrate.

12. An electrochemical device separator, comprising the porous carrier according to claim 1.

* * * * *